United States Patent
Huh et al.

(10) Patent No.: US 9,826,383 B2
(45) Date of Patent: Nov. 21, 2017

(54) SYSTEM AND METHOD FOR PROVIDING SERVICE USING TERMINAL SCANNING DEVICE, TERMINAL SCANNING DEVICE APPLIED TO SAME, AND OPERATION METHOD OF TERMINAL SCANNING DEVICE

(71) Applicant: SK PLANET CO., LTD., Seongnam-si, Gyeonggi-do (KR)

(72) Inventors: Jae Hyung Huh, Seongnam-si (KR); Chul Yong Shin, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 102 days.

(21) Appl. No.: 14/524,236

(22) Filed: Oct. 27, 2014

(65) Prior Publication Data
US 2015/0249915 A1    Sep. 3, 2015

(30) Foreign Application Priority Data
Mar. 3, 2014    (KR) ........................ 10-2014-0025203

(51) Int. Cl.
| | |
|---|---|
| H04W 4/00 | (2009.01) |
| H04B 7/00 | (2006.01) |
| H04M 1/66 | (2006.01) |
| H04M 1/68 | (2006.01) |
| H04M 3/16 | (2006.01) |

(Continued)

(52) U.S. Cl.
CPC ........... *H04W 8/005* (2013.01); *H04W 4/008* (2013.01)

(58) Field of Classification Search
CPC ... H04L 67/26; H04M 2203/053; H04W 4/00; H04W 4/001; H04W 4/003; H04W 4/008; H04W 4/02; H04W 4/023; H04W 4/025; H04W 4/04; H04W 4/043; H04W 4/12; H04W 4/14; H04W 4/18; H04W 4/20; H04W 4/206; H04W 4/22; H04W 8/005; H04W 12/00; H04W 48/08; H04W 76/023; H04W 84/045; H04W 84/18; H04W 88/02; H04W 88/06
USPC ........... 455/41.1, 41.2, 414.1, 418–420, 434, 455/456.1, 456.3
See application file for complete search history.

(56) References Cited

U.S. PATENT DOCUMENTS

| | | | | |
|---|---|---|---|---|
| 2006/0183462 A1* | 8/2006 | Kolehmainen | .......... | H04B 5/00 455/411 |
| 2009/0264070 A1* | 10/2009 | Lim | .................... | G06Q 30/0261 455/41.2 |

(Continued)

*Primary Examiner* — Rafael Pérez-Gutiérrez
*Assistant Examiner* — Mark G. Pannell
(74) *Attorney, Agent, or Firm* — Hauptman Ham, LLP

(57) ABSTRACT

Disclosed are a system and a method for providing a service using a terminal scanning device. When the terminal scanning device scans for a terminal located within a particular range, executes a particular application pre-installed in a terminal found through the scanning, and provides user information of the found terminal to a service server, the found terminal receives a particular service related to the user information from the service server through a link with the particular application executed by the terminal scanning device. Therefore, necessary information can be automatically provided to the terminal when the terminal approaches a particular place such as a shop or a building without a continuous scanning operation.

9 Claims, 4 Drawing Sheets

(51) Int. Cl.
*G06Q 40/00* (2012.01)
*H04W 8/00* (2009.01)

(56) References Cited

U.S. PATENT DOCUMENTS

| | | | |
|---|---|---|---|
| 2012/0245722 A1* | 9/2012 | Yamamura | G08C 17/02 |
| | | | 700/94 |
| 2012/0304268 A1* | 11/2012 | Komori et al. | G06F 21/36 |
| | | | 726/7 |
| 2014/0040120 A1* | 2/2014 | Cho | G06Q 20/3278 |
| | | | 705/39 |
| 2015/0004935 A1* | 1/2015 | Fu | H04W 12/08 |
| | | | 455/411 |
| 2015/0237573 A1* | 8/2015 | Li et al. | H04W 48/20 |
| | | | 370/329 |
| 2016/0004527 A1* | 1/2016 | Udd | G06F 9/44526 |
| | | | 717/172 |

\* cited by examiner

SYSTEM AND METHOD FOR PROVIDING SERVICE USING TERMINAL SCANNING DEVICE, TERMINAL SCANNING DEVICE APPLIED TO SAME, AND OPERATION METHOD OF TERMINAL SCANNING DEVICE

BACKGROUND OF THE INVENTION

1. Field of the Invention

The present disclosure relates to a service providing system using a terminal scanning device, and more particularly, to a system and a method for providing a service using a terminal scanning device capable of automatically providing required information to a terminal without a continuous scanning operation when the terminal approaches a particular place such as a shop or a building, a terminal scanning device applied to the same, and an operation method of the terminal scanning device.

2. Description of the Prior Art

These days, most people move to various places while carrying a minimum of one mobile terminal (for example, a smart phone or a mobile phone).

Meanwhile, recent terminals have various short-range wireless communication technologies and a BLUETOOTH® technology among the short-range wireless communication technologies enables wireless communication within a short range of about 10 m.

Recently, a service has appeared that automatically provides necessary information (for example, coupons, discount information, shop information and the like) to a terminal by using a BLUETOOTH® technology mounted to the terminal when the terminal approaches or enters a particular place such as a shop or a building.

However, the conventional BLUETOOTH®-based information providing service recognizes the approach or entry into the particular place such as the shop or the building by continuously scanning for a beacon device installed in the particular place such as the shop or the building in a state where an application (hereinafter, referred to as a service app) installed within the terminal is executed in the foreground or background.

Accordingly, the above described conventional BLUETOOTH®-based information providing service has a problem in which battery power consumption increases due to the continuous scanning operation of searching for the beacon device through the service app and the problem eventually becomes an obstacle to the generalization of the BLUETOOTH®-based information providing service.

Therefore, the present disclosure provides a method of allowing the terminal to use the BLUETOOTH®-based information providing service without the continuous scanning operation.

SUMMARY OF THE INVENTION

The present disclosure has been made to solve the above problems and an aspect of the present disclosure is to provide a system and a method for providing a service using a terminal scanning device in which, when the terminal scanning device scans for a terminal located within a particular range, executes a particular application pre-installed in a terminal found through the scanning, and provides user information of the found terminal to a service server, the found terminal receives a particular service related to the user information from the service server through a link with the particular application executed by the terminal scanning device, so as to automatically provide necessary information to the terminal when the terminal approaches a particular place such as a shop or a building without a continuous scanning operation.

The present disclosure has been made to solve the above problems and another aspect of the present disclosure is to provide a terminal scanning device and an operation method of the terminal scanning device in which, when the terminal scanning device scans for a terminal located within a particular range, executes a particular application pre-installed in a terminal found through the scanning, and provides user information of the found terminal to a service server, the service server provides a particular service related to the user information to the found terminal through a link with the particular application, so as to automatically provide necessary information to the terminal when the terminal approaches a particular place such as a shop or a building without a continuous scanning operation.

In accordance with an aspect of the present disclosure, a terminal scanning device is provided. The terminal scanning device includes: a terminal scanning unit configured to scan for a terminal located within a particular range; an application execution controller configured to execute a particular application pre-installed in a terminal found through the scanning; and an information provider configured to provide user information on the found terminal to a service server and allow the service server to provide a particular service related to the user information to the found terminal through a link with the particular application.

The terminal scanning unit may scan for a BLUETOOTH®-based signal transmitted from the terminal, and the found terminal may be a terminal that is located within a particular range from the terminal scanning device and transmits the BLUETOOTH®-based signal in a state where a BLUETOOTH® function is turned on by the pre-installed particular application.

The application execution controller may transmit a BLUETOOTH®-based control signal for executing the particular application to the found terminal and allow the found terminal to execute the particular application.

The user information may be information acquired from the BLUETOOTH®-based signal transmitted from the found terminal.

In accordance with another aspect of the present disclosure, a method of providing a service using a terminal scanning device is provided. The method includes: scanning for a terminal located within a particular range by the terminal scanning device; executing a particular application pre-installed in a terminal found through the scanning and providing user information on the found terminal to a service server by the terminal scanning device; and receiving a particular service related to the user information from the service server through a link with the particular application executed by the terminal scanning device, by the found terminal.

In accordance with another aspect of the present disclosure, a method of operating a terminal scanning device is provided. The method includes: scanning for a terminal located within a particular range; executing a particular application pre-installed in a terminal found through the scanning; and providing user information on the found terminal to a service server and allowing the service server to provide a particular service related to the user information to the found terminal through a link with the particular application.

The scanning for the terminal may include scanning for a BLUETOOTH®-based signal transmitted from the terminal, and the found terminal may be a terminal that is located within a particular range from the terminal scanning device and transmits the BLUETOOTH®-based signal in a state where a BLUETOOTH® function is turned on by the pre-installed particular application.

The executing of the particular application may include transmitting a BLUETOOTH®-based control signal for executing the particular application to the found terminal and allowing the found terminal to execute the particular application.

The user information may be information acquired from the BLUETOOTH®-based signal transmitted from the found terminal.

According to a system and a method for providing a service using a terminal scanning device, a terminal scanning device applied to the same, and an operation method of the terminal scanning device, an effect of automatically providing necessary information to a terminal when the terminal approaches a particular place such as a shop or a building without a continuous scanning operation is achieved.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
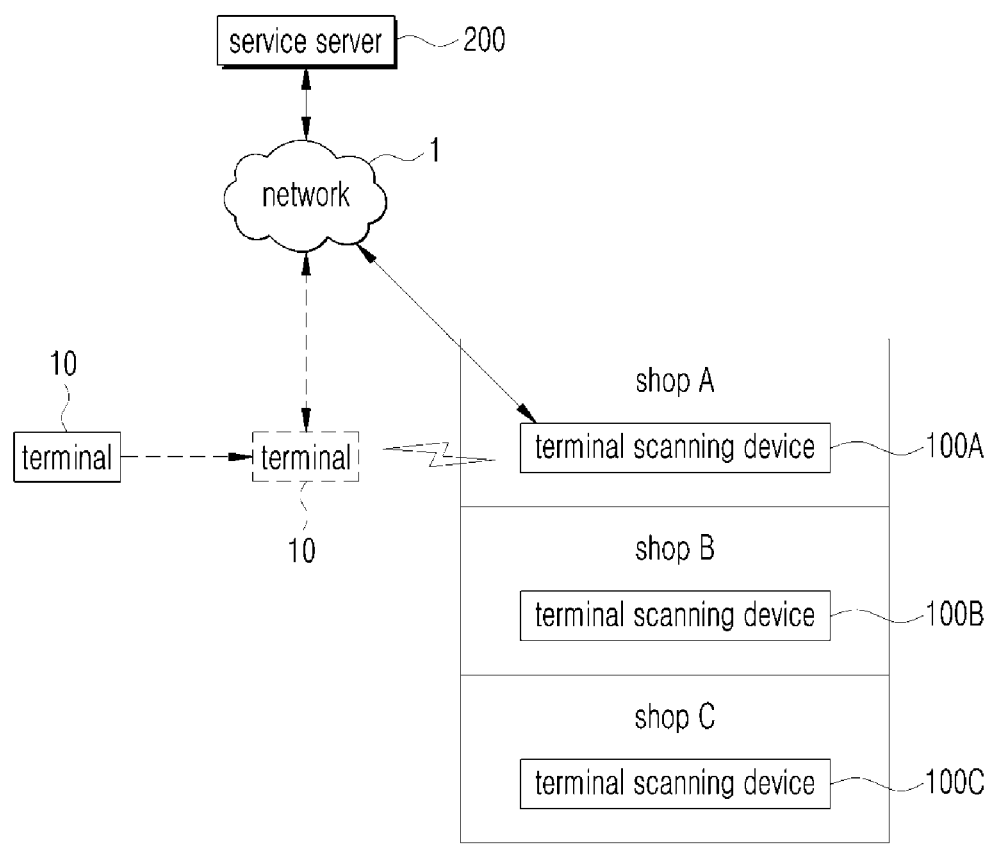
FIG. 1 illustrates an example of a system for providing a service using a terminal scanning device according to an exemplary embodiment of the present disclosure.

Hereinafter, exemplary embodiments of the present disclosure will be described with reference to the accompanying drawings.

First, a system for providing a service using a terminal scanning device according to an exemplary embodiment of the present disclosure will be described with reference to FIG. 1.

The service providing system according to the present disclosure is a system for a service (hereinafter, referred to as a short-range wireless communication-based information providing service) automatically providing required information (for example, coupons, discount information, shop information and the like) to a terminal by using a short-range wireless communication technology mounted to the terminal when the terminal approaches or enters a particular place such as a shop or a building.

At this time, it is preferable that, among various types of short-range wireless communication technologies which can be mounted to the terminal, particularly, a BLUETOOTH® technology is used in the present disclosure. Of course, in the present invention, other short-range wireless communication technologies (for example, Near Field Communication (NFC) and the like) as well as the BLUETOOTH® technology can be used.

Hereinafter, prior to the detailed description of the present disclosure, the conventional short-range wireless communication-based information providing service, that is, the conventional BLUETOOTH®-based information providing service will be briefly described below.

By continuously scanning for a beacon device installed in a particular place such as a shop or a building in a state where an application (hereinafter, referred to as a service app) installed within the terminal is executed in the foreground or background, approach or entry into the particular place such as the shop or the building is recognized.

When the terminal finds the beacon device installed in the particular place through the continuous scanning operation of the service app within the terminal and thus the approach or the entry into the particular place is recognized, necessary information (for example, coupons, discount information, shop information and the like) is automatically provided to the terminal from the beacon device.

The above described conventional BLUETOOTH®-based information providing service has a problem in which battery power consumption increases due to the continuous scanning operation of searching for the beacon device through the service app and the problem eventually becomes an obstacle to the generalization of the BLUETOOTH®-based information providing service.

The present disclosure suggests a device of a reverse beacon scheme of searching for a terminal through scanning and effectively provides a short-range wireless communication-based information providing service, that is, a BLUETOOTH®-based information providing service by using the device.

To this end, the service providing system according to the present disclosure includes a terminal 10, terminal scanning devices 100A, 100B, and 100C, and a service server 200.

At this time, the terminal scanning devices 100A, 100B, and 100C correspond to devices of a reverse beacon scheme which are installed in a particular place such as a shop or a building and search for a terminal through scanning.

For example, one terminal scanning device may be installed in each shop. That is, as illustrated in FIG. 1, the terminal scanning device 100A is installed in shop A, the terminal scanning device 100B is installed in shop B, and the terminal scanning device 100C is installed in shop C.

Of course, one terminal scanning device may be installed in each building or each floor.

Hereinafter, for the convenience of the description, the terminal scanning device 100A illustrated in FIG. 1A will be described as an example.

The terminal scanning device 100A scans for a terminal located within a particular range.

That is, the terminal scanning device 100A finds a terminal which approaches or enters shop A in which the terminal scanning device 100A is installed, by scanning for the terminal located within the particular range.

At this time, the terminal scanning device 100A scans for the terminal located within the particular range by using a short-range wireless communication technology and may scan for the terminal located within the particular range preferably by using a BLUETOOTH® technology.

The terminal scanning device 100A executes a particular application pre-installed in a terminal (for example, the terminal 10) found through the scanning and provides user information on the found terminal 10 to the service server 200 through a network 1 such as the Internet.

It is based upon the premise that a particular application for the short-range wireless communication-based information providing service, that is, the BLUETOOTH®-based information providing service which the present disclosure provides is pre-installed in the terminal 10.

Further, it is based on the premise that the terminal 10 has a short-range wireless communication technology, that is, a BLUETOOTH® technology.

Then, the terminal 10 in which the particular application for the present disclosure is pre-installed transmits a BLUETOOTH®-based signal in a state where a BLUETOOTH® function is turned on by the particular application and is configured in a discoverable mode which allows the terminal scanning devices 100A, 100B, and 100C to search for the terminal 10 through the scanning.

As a user having the terminal 10 moves in such a state, when the terminal 10 approaches or enter shop A and thus becomes close to the terminal scanning device 100A within a particular range as illustrated in FIG. 1A, the terminal scanning device 100A which continuously performs the scanning operation using the BLUETOOTH® technology searches for the terminal 10.

Then, the particular application pre-installed in the terminal 10 is executed by the terminal scanning device 100A, and the terminal 10 is linked with the service server 200 through the particular application and may receive a particular service related to user information of the terminal 10, that is, a BLUETOOTH®-based information providing service from the service server 200.

Hereinafter the terminal scanning device according to an exemplary embodiment of the present disclosure will be described in more detail with reference to FIG. 2.

The terminal scanning device 100 according to the present disclosure includes a terminal scanning unit 110 configured to scan for a terminal located within a particular range, an application execution controller 120 configured to execute a particular application pre-installed in the terminal found through the scanning, and an information provider 130 configured to provide user information on the found terminal to the service server 200 and allow the service server 200 to provide a particular service related to the user information to the found terminal through a link with the particular application.

The terminal scanning device 100 may be the same device as the terminal scanning device 100A, 100B, or 100C illustrated in FIG. 1.

The terminal scanning unit 110 scans for a terminal located within a particular range.

That is, the terminal scanning unit 110 finds a terminal which approaches or enters a particular place (for example, shop A) in which the terminal scanning device 100 is installed, by scanning for the terminal located within the particular range.

At this time, the terminal scanning unit 110 scans for the terminal located within the particular range by using a short-range wireless communication technology and may scan for the terminal located within the particular range preferably by using a BLUETOOTH® technology.

That is, the terminal scanning unit 110 may scan for the terminal located within the particular range from the terminal scanning device 100 by scanning for a BLUETOOTH®-based signal transmitted from the terminal.

When the terminal scanning unit 110 receives the BLUETOOTH®-based signal transmitted from the terminal, for example, the terminal 10 through the continuous scanning operation, the terminal scanning unit 110 searches for (finds) the terminal 10 as the terminal located within the particular range.

At this time, the found terminal 10 is located within the particular range from the terminal scanning device 100 and may be a terminal which transmits a BLUETOOTH®-based signal in a state where a BLUETOOTH® function is turned on by the pre-installed particular application, that is, the terminal configured in the aforementioned discoverable mode.

When the application execution controller 120 searches for the terminal, for example, the terminal 10 through the scanning, the application execution controller 120 executes the particular application pre-installed in the found terminal 10.

That is, it is preferable that the application execution controller 120 transmits the BLUETOOTH®-based signal for executing the particular application to the found terminal 10 and allows the terminal 10 to execute the particular application.

Then, the terminal 10 executes the particular application pre-installed in the terminal 10 by the application execution controller 120 of the terminal scanning device 100.

For example, in a process of installing the particular application for the present disclosure, a BLUETOOTH® broadcast receiver may be registered in the terminal 10.

When the BLUETOOTH® broadcast receiver within the terminal 10 receives a BLUETOOTH®-based control signal from the terminal scanning device 100, the BLUETOOTH® broadcast receiver may execute and activate the particular application in an inactive state pre-installed in the terminal 10 according to the received BLUETOOTH®-based control signal.

When the terminal, for example, the terminal 10 is found through the scanning, the information provider 130 provides user information on the found terminal 10 to the service server 200 through the network 1 such as the Internet.

At this time, it is preferable that the user information is information acquired from the BLUETOOTH®-based signal transmitted from the found terminal 10.

That is, in transmitting the BLUETOOTH®-based signal for allowing the terminal scanning device 100 configured in the discoverable mode to search for the terminal 10 through the scanning, the information provider 130 may also transmit user information of the terminal 10, for example, a BLUETOOTH® Mac address, terminal identification information (for example, a phone number), and information on a service subscription ID.

Then, the information provider 130 may acquire the user information from the BLUETOOTH®-based signal from the terminal 10 found by the terminal scanning unit 110 through the scanning and provide the acquired user information of the terminal 10 to the service server 200 through the network 1.

Of course, the information provider 130 may transmit a BLUETOOTH®-based user information request signal to the found terminal 10, acquire user information from the BLUETOOTH®-based signal transmitted (answered) from the terminal 10 in response to the BLUETOOTH®-based user information request signal, and provide the acquired user information of the terminal 10 to the service server 200 through the network 1.

Then, through a link with the particular application executed within the terminal 10, the service server 200 may provide the particular service which automatically provides necessary information related to the user information of the terminal 10, for example, coupons which can be used in shop A, discount information of shop A, and shopping information of shop A, that is, the BLUETOOTH®-based information providing service to the terminal 10.

Figure 2:
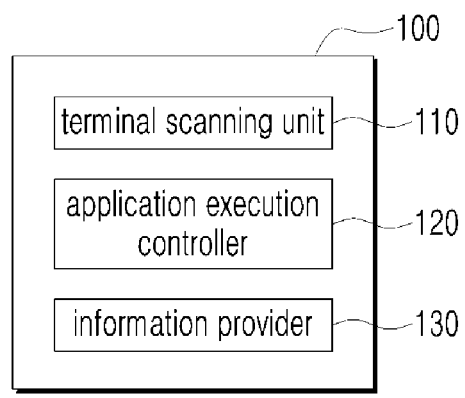
FIG. 2 illustrates a configuration of a terminal scanning device according to an exemplary embodiment of the present disclosure.

Meanwhile, although not illustrated in FIGS. 1 and 2, a Point Of Sales (POS) terminal (not shown) may be installed in the particular shop, that is, shop A in which the terminal scanning device 100 is installed. In this case, the service server 200 may provide the user information of the terminal 10 received from the terminal scanning device 100 to the POS terminal (not shown) installed in the place such as the terminal scanning device 100. For example, the service server 200 maps identification information of the terminal scanning device 100 and identification information of the POS terminal (not shown) which are installed in the same place and thus provide the user information of the terminal 10 received from the terminal scanning device 100 to the mapped POS terminal (not shown).

When the terminal 10 displays and provides information according to a particular service received from the service server 200, for example, coupons of shop A, the POS terminal (not shown) may variously use the user information of the terminal 10 such as authenticating whether the terminal 10 is a terminal which reasonably receives a corresponding coupon.

As described above, according to the terminal scanning device and the service providing system using the terminal scanning device, since necessary information can be automatically provided to the terminal when the terminal approaches a particular place such as a shop or a building without the continuous scanning operation through an app, an effective service that automatically provides necessary information to the terminal while reducing unnecessary battery power consumption of the terminal can be provided.

Figure 3:
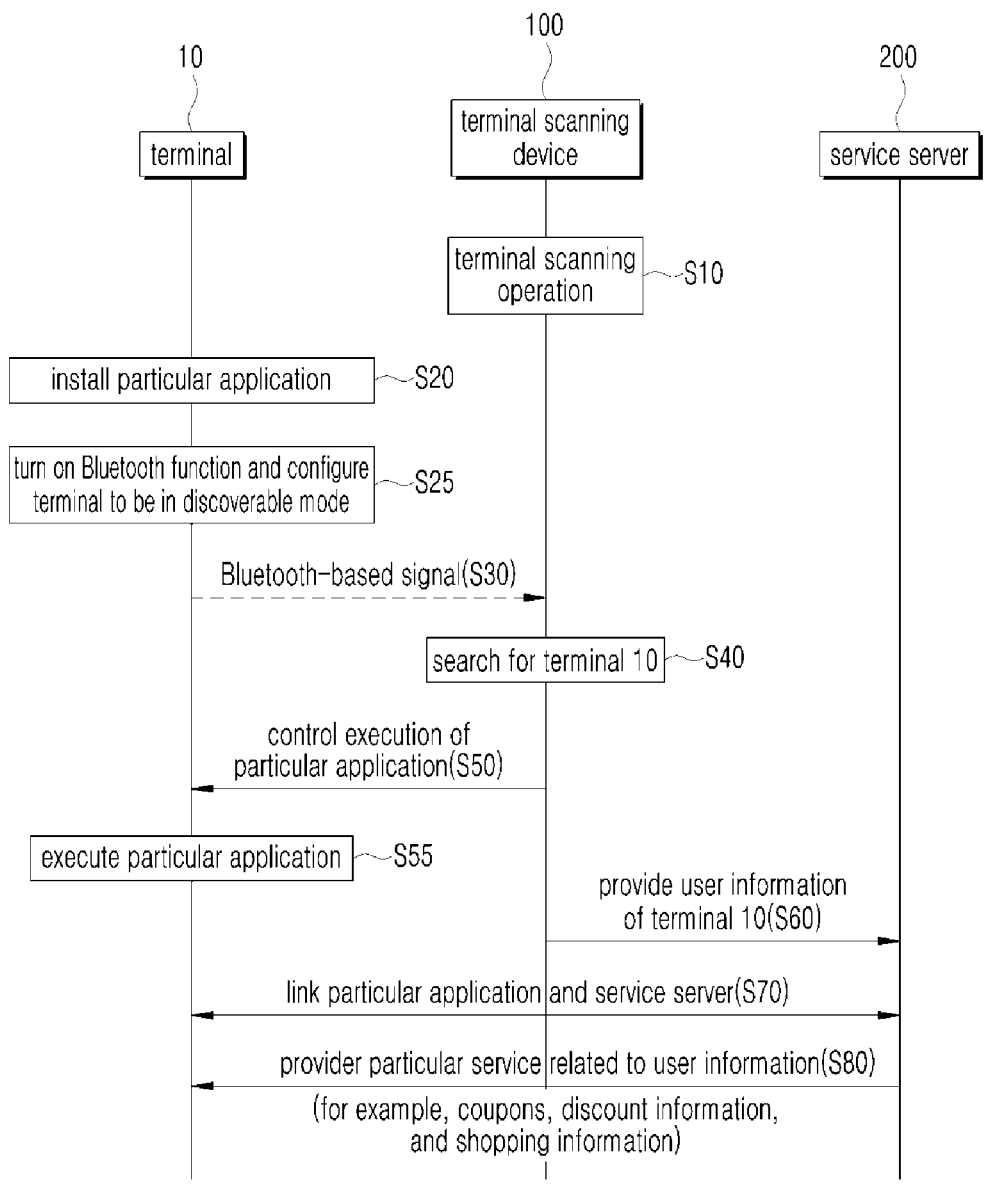
FIG. 3 illustrates an example of a method of providing a service using a terminal scanning device according to an exemplary embodiment of the present disclosure.
Figure 4:
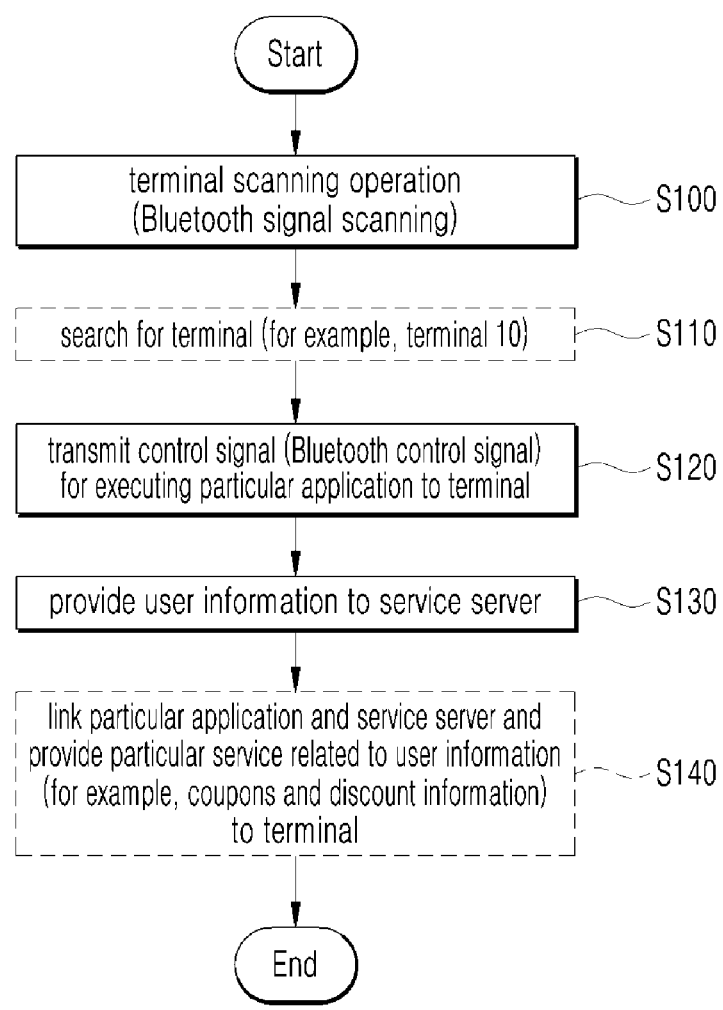
FIG. 4 is a flowchart illustrating an operation method of a terminal scanning device according to an exemplary embodiment of the present disclosure.

Hereinafter, a service providing method using the terminal scanning device according to an exemplary embodiment of the present disclosure will be described with reference to FIGS. 3 and 4.

First, a service providing method using the terminal scanning device according to an exemplary embodiment of the present disclosure will be described with reference to FIG. 3.

Hereinafter, for the convenience of the description, the terminal 10 and the terminal scanning device 100 will be described as an example.

The terminal scanning device 100 according to the present disclosure performs an operation of scanning for a terminal located within a particular range.

That is, the terminal scanning device 100 finds a terminal which approaches or enters shop A in which the terminal scanning device 100 is installed, by scanning for the terminal located within the particular range through a BLUETOOTH® technology.

Meanwhile, it is based upon the premise that a particular application for the short-range wireless communication-based information providing service, that is, the BLUETOOTH®-based information providing service which the present disclosure provides is pre-installed in the terminal 10 in step S20.

Then, the terminal 10 in which the particular application for the present disclosure is pre-installed transmits a BLUETOOTH®-based signal in a state where a BLUETOOTH® function is turned on by the particular application and is configured in a discoverable mode which allows the terminal scanning device 100 to search for the terminal 10 through the scanning in step S25.

That is, the terminal 10 configured in the discoverable mode transmits the BLUETOOTH®-based signal in step S30.

As a user having the terminal 10 moves in such a state, when the terminal 10 approaches or enters shop A and thus becomes close to the terminal scanning device 100 within a particular range, the terminal scanning device 100 which continuously performs the scanning operation using the BLUETOOTH® technology searches for the terminal 10 in step S40.

Then, the terminal scanning device 100 executes the particular application pre-installed in the terminal 10 found through the scanning in step S50 and provides user information of the terminal 10 to the service server 200 in step S60.

Subsequently, the particular application pre-installed in the terminal 10 is executed by the terminal scanning device 100 in step S55, and the terminal 10 is linked with the service server 200 through the particular application in step S70, so that the terminal 100 can receive a particular service, that is, a BLUETOOTH®-based information providing service that automatically provides necessary information related to the user information of the terminal 10, for example, coupons which can be used in shop A, discount information of shop A, and shopping information of shop from the service server 200 in step S80.

Hereinafter, an operation method of the terminal scanning device according to an exemplary embodiment of the present disclosure will be described in detail with reference to FIG. 4.

In the operation method of the terminal scanning device 100 according to the present disclosure, a terminal which approaches or enters a particular place (for example, shop A) in which the terminal scanning device 100 is installed is found by scanning for the terminal located with a particular range in step S100.

In the operation method of the terminal scanning device 100 according to the present disclosure, the terminal located within the particular range may be scanned for by using a BLUETOOTH® technology.

That is, in the operation method of the terminal scanning device 100 according to the present disclosure, the terminal located within the particular range from the terminal scanning device 100 may be scanned for by scanning for a BLUETOOTH®-based signal transmitted from the terminal.

In the operation method of the terminal scanning device according to the present disclosure, when the BLUETOOTH®-based signal transmitted from the terminal, for example, the terminal 10 is received through the continuous scanning operation, the terminal 10 is searched for (found) as the terminal located within the particular range in step S110.

At this time, the found terminal 10 is located within the particular range from the terminal scanning device 100 and may be a terminal which transmits a BLUETOOTH®-based signal in a state where a BLUETOOTH® function is turned on by the pre-installed particular application, that is, the terminal configured in the aforementioned discoverable mode.

In the operation method of the terminal scanning device 100 according to the present disclosure, when the terminal, for example, the terminal 10 is found through the scanning, the particular application pre-installed in the found terminal 10 is executed in step S120.

That is, in the operation method of the terminal scanning device 100 according to the present disclosure, it is preferable that the BLUETOOTH®-based signal for executing the particular application is transmitted to the found terminal 10 and thus the terminal 10 executes the particular application.

Then, the terminal 10 executes the particular application pre-installed in the terminal 10 by the terminal scanning device 100.

Meanwhile, in the operation method of the terminal scanning device 100 according to the present disclosure, when the terminal, for example, the terminal 10 is found through the scanning, user information on the found terminal 10 is provided to the service server 200 through the network 1 such as the Internet in step S130.

At this time, it is preferable that the user information is information acquired from the BLUETOOTH®-based signal transmitted from the found terminal 10.

That is, when the BLUETOOTH®-based signal is transmitted to allow the terminal scanning device 100 configured in the discoverable mode to search for the terminal 10 through the scanning, user information of the terminal 10, for example, a BLUETOOTH® Mac address, terminal identification information (for example, a phone number), and information on a service subscription ID may be also transmitted.

Then, in the operation method of the terminal scanning device 100 according to the present disclosure, the user information may be acquired from the BLUETOOTH®-based signal received from the terminal 10 through the scanning in step S110 and the acquired user information of the terminal 10 may be provided to the service server 200 through the network 1 in step S130.

Of course, in the operation method of the terminal scanning device 100 according to the present disclosure, a BLUETOOTH®-based user information request signal may be transmitted to the found terminal 10, user information may be acquired from the BLUETOOTH®-based signal transmitted (answered) from the terminal 10 in response to the BLUETOOTH®-based user information request signal, and the acquired user information of the terminal 10 may be provided to the service server 200 through the network 1 in step S130.

Then, through a link with the particular application executed within the terminal 10, the service server 200 may provide the particular service which automatically provides necessary information related to the user information of the terminal 10, for example, coupons which can be used in shop A, discount information of shop A, and shopping information of shop A, that is, the BLUETOOTH®-based information providing service to the terminal 10 in step S140.

As described above, according to the terminal scanning device and the service providing method using the terminal scanning device, since necessary information can be automatically provided to the terminal when the terminal approaches a particular place such as a shop or a building without the continuous scanning operation through an app, an effective service that automatically provides necessary information to the terminal while reducing unnecessary battery power consumption of the terminal can be provided.

The operation method of the terminal device according to an embodiment of the present disclosure may be implemented in the form of program commands executable through various computer means and recorded in a computer readable medium. The computer readable medium may include a program command, a data file, a data structure, and the like independently or in combination. The program command recorded in the medium may be things specially designed and configured for the present invention, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware devices may be configured to operate as one or more software modules to perform the operations of the present invention, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

INDUSTRIAL APPLICABILITY

According to a system and a method for providing a service using a terminal scanning device, a terminal scanning device applied to the same, and an operation method of the terminal scanning device according to the present disclosure, the present disclosure is highly applicable to the industries since, as the present disclosure passes the limit of the conventional technologies, related technologies of the present disclosure can be used and also the device to which the present disclosure is applied has a high probability of entering into the market and being sold, and thus the present disclosure can be obviously implemented in reality in that necessary information can be automatically provided to a terminal when the terminal approaches a particular place such as a shop or building without the continuous scanning operation through an app.

What is claimed is:
1. A terminal scanning device, comprising:
a terminal scanner comprising a short-range wireless communication module and configured to scan for a terminal located within a particular range through the short-range wireless communication module;
an application execution controller configured to execute, through the short-range wireless communication module, a particular application pre-installed in a terminal found by the terminal scanner; and
an information provider configured to, when the particular application is executed in the found terminal,
    acquire user information from the found terminal through the short-range wireless communication module without a user logon,
    automatically provide the acquired user information on the found terminal to a service server through a network, and
    cause the service server to provide, based on the acquired user information and by interworking with the executed particular application, a particular service to the found terminal through the network,
wherein the user information comprises terminal identification information on the found terminal,
wherein the service server provides the acquired user information to a Point Of Sales (POS) terminal installed in the same place where the terminal scanning device is installed, and wherein when the found terminal provides information according to the particular service with respect to the POS terminal, the POS terminal authenticates whether the found terminal receives the information according to the particular service using the acquired user information provided from the service server.

2. The terminal scanning device of claim 1, wherein
the terminal scanner is configured to scan for a BLUETOOTH®-based signal transmitted from the terminal, and
the found terminal is a terminal that is located within the particular range from the terminal scanning device and transmits the BLUETOOTH®-based signal in a state where a BLUETOOTH® function is turned on by the particular application.

3. The terminal scanning device of claim 2, wherein the user information is acquired from the BLUETOOTH®-based signal transmitted from the found terminal.

4. The terminal scanning device of claim 1, wherein the application execution controller is configured to transmit a BLUETOOTH®-based control signal for executing the particular application to the found terminal and cause the found terminal to execute the particular application.

5. A method of providing a service using a terminal scanning device, the method comprising:
scanning, through short-range wireless communication, for a terminal located within a particular range by the terminal scanning device;
executing, through the short-range wireless communication, a particular application pre-installed in a terminal found by the scanning;
when the particular application is executed in the found terminal, acquiring, through the short-range wireless communication, user information from the found terminal by the terminal device without a user logon;
automatically providing, through a network, the acquired user information on the found terminal to a service server by the terminal scanning device; and
receiving, through a network, a particular service related to the acquired user information from the service server through interworking with the particular application executed by the terminal scanning device, by the found terminal;
providing the acquired user information to a Point Of Sales (POS) terminal installed in the same place where the terminal scanning device is installed, by the service server; and
when the found terminal provides information according to the particular service with respect to the POS terminal, authenticating whether the found terminal receives the information according to the particular service using the acquired user information provided from the service server, by the POS terminal,
wherein the user information comprises terminal identification information on the found terminal.

6. A method of operating a terminal scanning device, the method comprising:
scanning, through short-range wireless communication, for a terminal located within a particular range;
executing, through the short-range wireless communication, a particular application pre-installed in a terminal found through the scanning;
when the particular application is executed in the found terminal, acquiring, through the short-range wireless communication, user information from the found terminal without a user logon; and
automatically providing the acquired user information on the found terminal to a service server;
causing the service server to provide, based on the acquired user information and by interworking with the executed particular application, a particular service to the found terminal through a network; and
causing the service server to provide the acquired user information to a Point Of Sales (POS) terminal installed in the same place where the terminal scanning device is installed, so that when the found terminal provides information according to the particular service with respect to the POS terminal, the POS terminal be able to authenticate whether the found terminal receives the information according to the particular service using the acquired user information provided from the service server,
wherein the user information comprises terminal identification information on the found terminal.

7. The method of claim 6, wherein the scanning for the terminal comprises scanning for a BLUETOOTH®-based signal transmitted from the terminal, and the found terminal is a terminal that is located within a particular range from the terminal scanning device and transmits the BLUETOOTH®-based signal in a state where a BLUETOOTH® function is turned on by the particular application.

8. The method of claim 7, wherein the user information is acquired from the BLUETOOTH®-based signal transmitted from the found terminal.

9. The method of claim 6, wherein the executing of the particular application comprises transmitting a BLUETOOTH®-based control signal for executing the particular application to the found terminal and causing the found terminal to execute the particular application.

* * * * *